US008207955B2

(12) United States Patent
Morimoto

(10) Patent No.: US 8,207,955 B2
(45) Date of Patent: Jun. 26, 2012

(54) IMAGE COMPENSATION DEVICE, IMAGE COMPENSATION METHOD, AND A METHOD FOR SETTING IMAGE COMPENSATION VALUES

(75) Inventor: Masami Morimoto, Fuchu (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 510 days.

(21) Appl. No.: 12/486,609

(22) Filed: Jun. 17, 2009

(65) Prior Publication Data

US 2010/0073340 A1 Mar. 25, 2010

(30) Foreign Application Priority Data

Sep. 22, 2008 (JP) ................................. 2008-243044
Mar. 31, 2009 (JP) ................................. 2009-085888

(51) Int. Cl.
*G06F 3/038* (2006.01)
*G09G 5/00* (2006.01)
*G09G 5/10* (2006.01)
*G09G 3/36* (2006.01)

(52) U.S. Cl. ......... 345/207; 345/690; 345/204; 345/102

(58) Field of Classification Search .................. 345/207, 345/204, 690, 102
See application file for complete search history.

(56) References Cited

U.S. PATENT DOCUMENTS 7,057,624 B2 * 6/2006 Ten ............................... 345/589
2005/0212824 A1 * 9/2005 Marcinkiewicz et al. ..... 345/690
2006/0033749 A1 * 2/2006 Yamada ........................ 345/595
2006/0132424 A1 * 6/2006 Foo et al. ...................... 345/102
2007/0091082 A1 * 4/2007 Huang .......................... 345/207
2007/0229435 A1 * 10/2007 Lee ................................ 345/98
2008/0266332 A1 10/2008 Inoue et al.
2009/0015541 A1 1/2009 Honbo
2010/0002027 A1 1/2010 Krijn et al.
2010/0123740 A1 5/2010 Inoue et al.

FOREIGN PATENT DOCUMENTS

JP 2005-258404 A 9/2005

(Continued)

OTHER PUBLICATIONS

Japanese Office Action dated May 17, 2011 (and English translation thereof) in counterpart Japanese Application No. 2009-085888.

*Primary Examiner* — Alexander S Beck
*Assistant Examiner* — Joseph Pena
(74) *Attorney, Agent, or Firm* — Holtz, Holtz, Goodman & Chick, PC

(57) ABSTRACT

An image compensation device includes a transform unit configured to convert a value obtained by multiplying an intensity of the ambient light by a reflection ratio to a value of the same form as a first gradation value, and acquire a second gradation value, a subtracter to subtract the second gradation value from a third gradation value obtained through the first inverse transform performed on a first gradation value, and acquire a fourth gradation value, a transform unit configured to perform a second inverse transform on the fourth gradation value and acquire a fifth gradation value, and a storage unit configured to store a look-up table in which the fifth gradation value is associated with the first gradation value, as a correction value which should be applied to the display panel in place of the first gradation value.

18 Claims, 4 Drawing Sheets

FOREIGN PATENT DOCUMENTS

| | | | |
|---|---|---|---|
| JP | 2007-140234 | A | 6/2007 |
| JP | 2007-241059 | A | 9/2007 |
| JP | 2007-248936 | A | 9/2007 |
| JP | 2007-249085 | A | 9/2007 |
| JP | 2009-15265 | A | 1/2009 |
| WO | 2008/099338 | A1 | 8/2008 |
| WO | 2008/136358 | A1 | 11/2008 |

* cited by examiner

IMAGE COMPENSATION DEVICE, IMAGE COMPENSATION METHOD, AND A METHOD FOR SETTING IMAGE COMPENSATION VALUES

CROSS-REFERENCE TO RELATED APPLICATIONS

This application is based upon and claims the benefit of priority from prior Japanese Patent Applications No. 2006-243044, filed Sep. 22, 2008; and No. 2009-085888, filed Mar. 31, 2009, the entire contents of both of which are incorporated herein by reference.

BACKGROUND OF THE INVENTION

1. Field of the Invention

The present intention relates to color compensation of input images to display on a display panel.

2. Description of the Related Art

As known in the art, the color of an input image displayed by a display panel (e.g., liquid crystal display (LCD) panel or organic electric luminescence (EL) panel) differs from the color a viewer perceives of the displayed image. One of the causes of this difference is the influence of ambient light reflected by the display panel. That is, the image displayed is superimposed with the reflected light even if the display panel displays an image faithful to the input image. As a result, the viewer perceives the image as one that differs in color from the input image.

JP-A 2007-248936 (KOKAI) discloses an image processing apparatus that performs an image processing to improve the visual-recognition property of images displayed in a high-illuminance environment. More specifically, the apparatus converts an input video signal to a color space defined by hue, saturation and lightness, and increases the lightness and saturation in accordance with a rise in illumination, thereby enhancing the color contrast.

JP-A 2005-258404 (KOKAI) discloses a liquid crystal display in which the luminance of the backlight is increased in order to improve the visual-recognition property of images displayed in a high-illuminance environment.

The image processing apparatus of JP-A 2007-248436 (KOKAI) and the liquid crystal display of JP-A 2005-258404 (KOKAI) increase the lightness of the color space and the luminance of the backlight, respectively, thus correcting the image to enhance the visual-recognition property of images. Here arises a problem. The higher the reflection ratio of the display panel and the illuminance of ambient light, the greater the influence of the reflected light will be. The use of this image correcting method is inevitably limited. If this method is employed in devices (e.g., cellular phones) that may be used in high-illuminance environments (for example, in direct sunlight), hardware-related problems may occur. Further, this image correcting method is not desirable in terms of power consumption. Moreover, the image correcting method according to JP-A 2005-258404 (KOKAI) cannot be applied to display panels such as organic EL panels which have no backlights.

BRIEF SUMMARY OF THE INVENTION

According to an aspect of the invention, there is provided an image compensation device comprising: a light sensor which measures an intensity of external light incident on the display panel; a first storage unit configured to store a reflectance of the display panel; a first transform unit configured to convert a value obtained by multiplying the intensity of the ambient light by the reflection ratio to a value of the same form as a first gradation value to be applied to the display panel, and acquire a second gradation value; a subtracter which subtracts the second gradation value from a third gradation value obtained through a first inverse transform corresponding to gamma correction already performed on the first gradation value, and acquires a fourth gradation value; a second transform unit configured to perform a second inverse transform corresponding to a display characteristic of the display panel on the fourth gradation value, and acquire a fifth gradation value; a second storage unit configured to store a first look-up table in which the fifth gradation value is associated with the first gradation value, as a correction value which should be applied to the display panel in place of the first gradation value; and a compensation unit configured to use the first look-up table, and compensate an image input to the display panel.

According to another aspect of the invention, there is provided a method for setting image compensation values, comprising: subtracting a second gradation value corresponding to a leakage spectrum value of a backlight illuminating a display panel from a third gradation value obtained through a first inverse transform corresponding to gamma correction already performed on a first gradation value to be applied to the display panel, and acquiring a fourth gradation value; performing a second inverse transform corresponding to a display characteristic of the display panel on the fourth gradation value, and acquiring a fifth gradation value; and setting a first look-up table in which the fifth gradation value is associated with the first gradation value, as a correction value which should be applied the display panel in place of the first gradation value.

DETAILED DESCRIPTION OF THE INVENTION

Embodiments of this invention will be described with reference to the accompanying drawings.

First Embodiment

Figure 1:
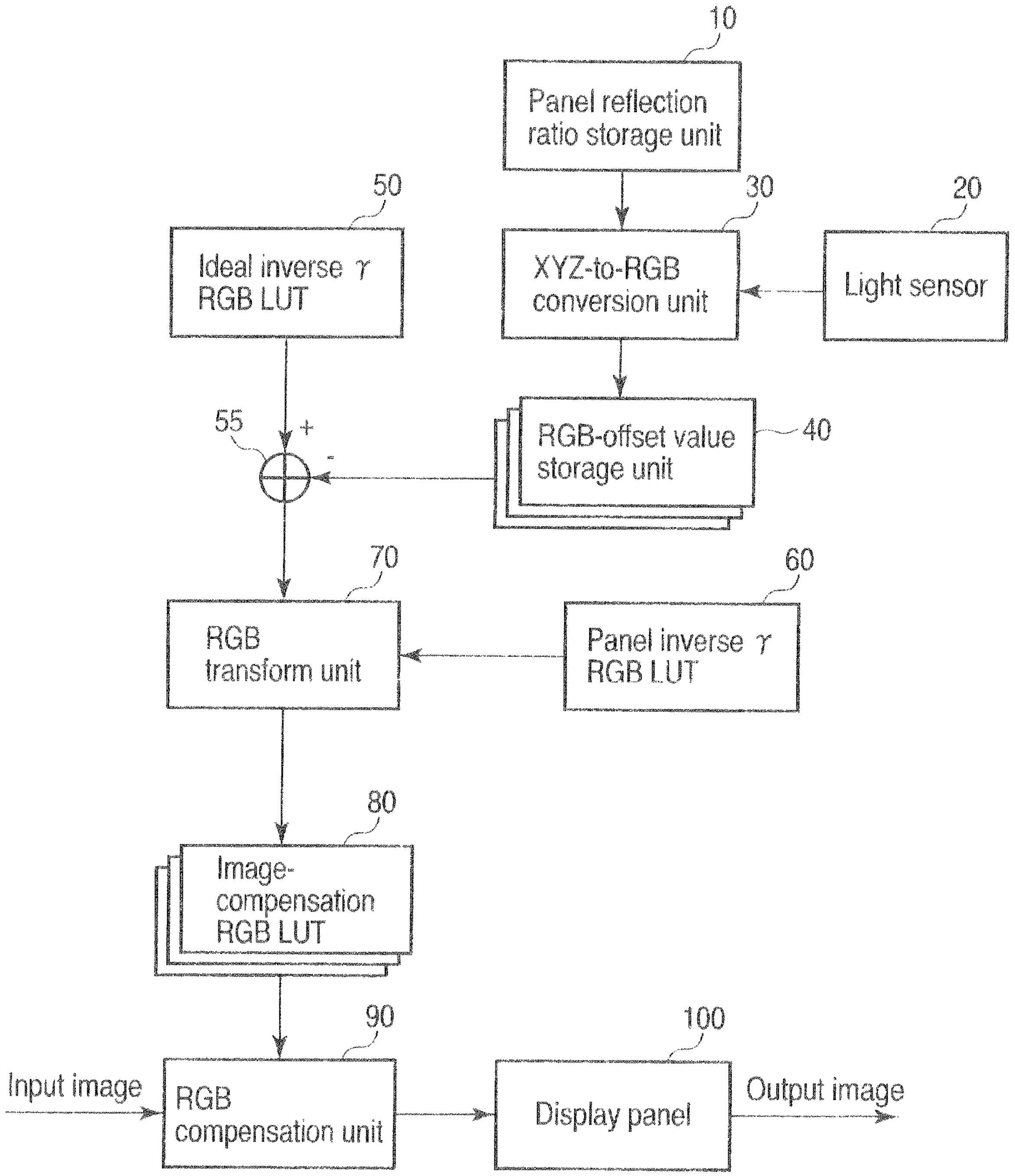
FIG. 1 is a block diagram showing an image compensation device and a display panel, both according to a first embodiment of the present invention.

As shown in FIG. 1, an image compensation device according to the first embodiment of the invention comprises a panel reflection ratio storage unit 10, a light sensor 20, an XYZ-to-RGB conversion unit 30, an RGB-offset value storage unit 40, an ideal inverse gamma RGB look-up table (LUT) storage unit 50, a subtracter 55, a panel inverse gamma RGB LUT storage unit 60, an RGB transform unit 70, an image-compensation RGB LUT storage unit 80, and an RGB compensation unit 90. The image compensation device compensates the gradation value (RGB value) of any input image supplied to a display panel 100. The term "input image" means the frames that constitute the moving picture contained in a broadcast signal transmitted from a broadcasting station, or the frames that constitute a moving picture stored in a storage medium.

The display panel 100 is a device that can display images, such as a liquid crystal display (LCD) panel or art organic electroluminescence (EL) display panel. The display panel 100 displays an input image, whose gradation value has been compensated by the image compensation device shown in FIG. 1. Thus, the display panel 100 provides an output image.

The panel reflection ratio storage unit 10 stores the reflection ratio of the display panel 100. The reflection ratio of the display panel 100 is a value measured by a given measuring means. The reflection ratio stored in the panel reflection ratio storage unit 10 is read by the XYZ-to-RGB conversion unit 30 (described later), when necessary.

The light sensor 20 is arranged around the display panel 100 and detects ambient light that is incident on the display panel 100. The light sensor 20 may be any type that can detect a tristimulus value (X, Y, Z), such as a spectral radiometer, or any type that can detect only a Y-signal value (luminance) such as an illuminance sensor. Further, the light sensor 20 may detect the ambient light at all times or at preset times. The light sensor 20 inputs the data representing the intensity of the ambient light detected, to the XYZ-to-RGB conversion unit 30.

The XYZ-to-RGB conversion unit 30 multiplies the intensity of ambient light the light sensor 20 has detected, by the reflection ratio that has been read from the panel reflection ratio storage unit 10. As a result, the XYZ to RGB conversion unit 30 acquires light intensity simulating that of the reflected light. The XYZ-to-RGB conversion unit 30 then converts the light intensity simulating the reflected light of XYZ form, to the intensity of an RGB form, thus acquiring an RGB offset value (R0, G0, B0). The XYZ-to-RGB conversion unit 30 stores (writes) the RGB offset value in the RGB-offset value storage unit 40. The RGB-offset value storage unit 40 may have already stored an RGB offset value previously acquired. In this case, the XYZ-to-RGB conversion unit 30 rewrites the RGB offset value (R0, G0, B0), thereby updating the same.

The light sensor 20 may be an illuminance sensor. In this case, the same RGB offset value may be allocated common to red (R), green (G) and blue (B), or a prescribed RGB value (e.g., model simulating natural light or artificial light corresponding to a specific illuminance) may be applied in accordance with the illuminance the light sensor 20 has measured.

If the display panel 100 has an sRGB characteristic, the CIE XYZ-RGB conversion expression can be applied. The XYZ-to-RGB conversion unit 30 therefore converts the intensity (X, Y, Z) of ambient light, which has already been multiplied by the reflection ratio, to an RGB offset value (R0, G0, B0), using the following expression (1):

$$R0=3.240X-1.537Y-0.499Z$$

$$G0=-0.969X+1.876Y+0.042Z$$

$$B0=0.056X-0.204Y+1.057Z \quad (1)$$

where (X, Y, Z) is normalized on the basis of a Y signal value of 100.

The ideal inverse γRGB LUT storage unit 50 stores an ideal inverse γRGB LUT that is allocated with an output gradation value obtained by performing γ correction on a prescribed value (e.g., 2.2). Most broadcast signals subjected to gamma correction in broadcasting stations. Therefore, the gradation value at which to display an image has a linear relationship with the broadcast signal. Hence, the above-mentioned gamma value is preferably a reciprocal (=2.2) of the gamma value (=0.45=1/2.2) applied to the gamma correction performed in broadcasting stations. That is, the ideal inverse γRGB LUT is not necessarily limited to one that achieves the inverse transform equivalent to the γ correction performed on a gradation value that may be input to the display panel 100, though it should desirably be such a LUT. In the case where the prescribed gamma value is 2.2, the output gradation value (revR[R], revG[G], revB[B]) that the LUT should allocate to the input gradation value (R, G, B) is derived by the following expression (2):

$$revR[n]=255\times\left(\frac{n}{255}\right)^{2.2} \quad (2)$$

$$revG[n]=255\times\left(\frac{n}{255}\right)^{2.2}$$

$$revB[n]=255\times\left(\frac{n}{255}\right)^{2.2}$$

where n is the input gradation value (0 to 255).

That is, R, G and B are 8-bit values (thus, RGB being 24-bit value), each can assume a value ranging from 0 to 255. The number of bits constituting each of R, G and B values is not limited to 8. R, G and B values say each be composed of any other number of bits.

The subtracter 55 subtracts the RGB offset value stored in the RGB-offset value storage unit 40, from the gradation value (revR[R], revG[G], revB[B]) output from the ideal inverse γRGB LUT. More specifically, the subtracter 55 performs the operation defined by the following expression (3). The result of the subtraction, (R1[*n*], G1[*n*], R1[*n*]), is input to the RGB transform unit 70.

$$R1[n]=\text{rev}R[n]-R0$$

$$G1[n]=\text{rev}G[n]-G0$$

$$B1[n]=\text{rev}B[n]-B0 \quad (3)$$

Figure 2:
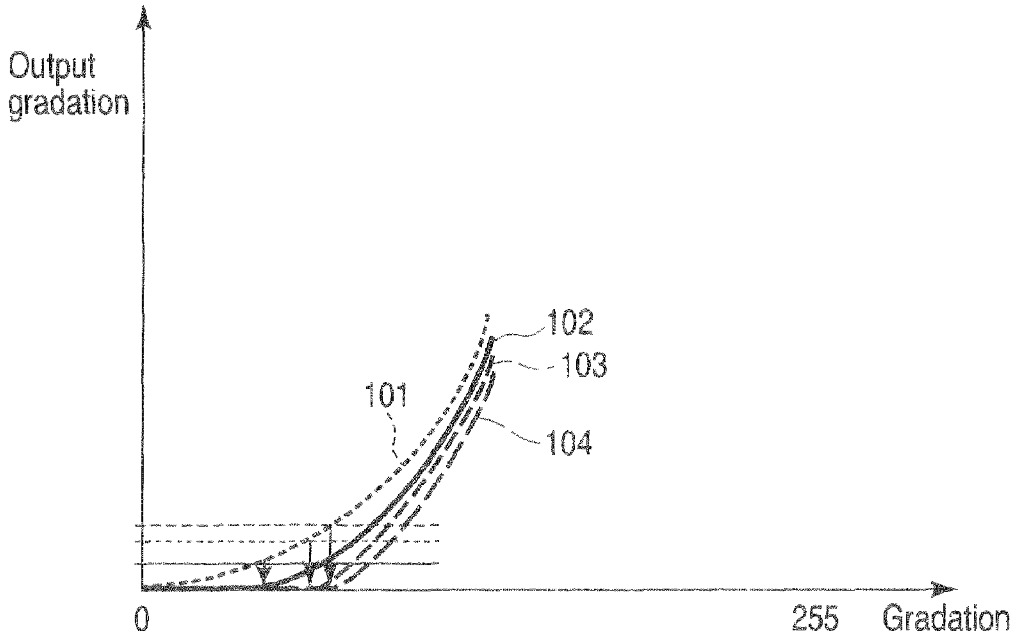
FIG. 2 is a graph representing the concept of the subtraction performed in the subtracter shown in FIG. 1.

That is, as seen from FIG. 2, the offset value R0 for the R signal, the offset value G0 for the G signal and the offset value B0 for the B signal are subtracted from the ideal inverse gamma curves (revR[n], revG[n] and revB[n]) 101, respectively. R1[*n*] 102, G1[*n*] 103 and B1[*n*] 104 are thereby derived.

The subtraction of the RGB offset values, defined by the expression (3), has a specific technical significance, which will be described below in brief.

Figure 3A:
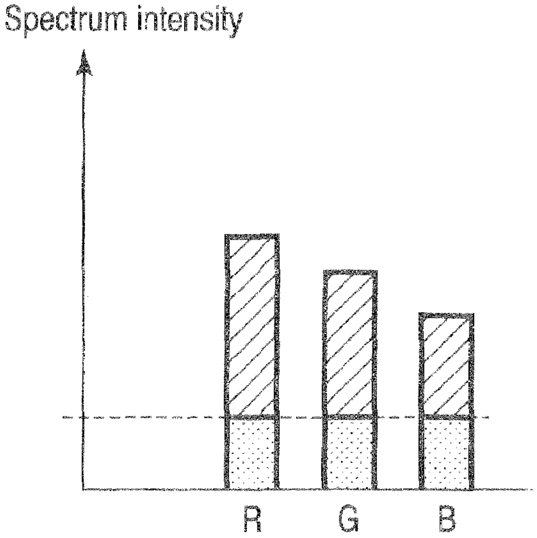
FIG. 3A is a graph schematically showing how the reflected ambient light influences the image displayed on the display panel.
Figure 3B:
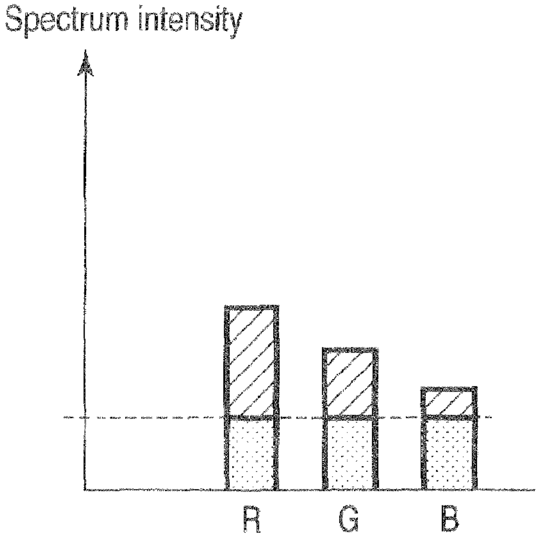
FIG. 3B is a graph representing the concept of the conversion process for cancelling the influence of reflected ambient light, which is shown in FIG. 3A.

Even if the display panel 100 displays an image faithful to the RGB value of the input image (hereinafter referred to as "input RGB value"), the viewer will perceive this image as superimposed with the reflected ambient light. In other words, the viewer perceives that the RGB spectrum of the image based on the input RGB value and the RGB spectrum of the reflected ambient light are superimposed on each other as shown in, for example, FIG. 3A. In FIG. 3A, the hatched regions are R, G and B spectra based on the input image, and the shaded regions are R, G and B spectra based on the reflected ambient light. Therefore, if the image is corrected, subtracting (or cancelling) the R, G and B spectra of the reflected ambient light from the R, G and B spectra of the image based on the input RGB value, as is illustrated in FIG. 3B, it will be perceived by the viewer as faithful to the input RGB value.

The panel inverse gamma RGB LUT storage unit 60 stores a panel inverse gamma RGB LUT in which output gradation values calculated through gamma correction performed on the input gradation value by applying a prescribed gamma value (e.g., 0.45) are allocated to the input gradation values. The display panel 100 has a specific display characteristic (gamma value) in most cases. The input gradation value (i.e., gradation in which the image should be displayed) is therefore converted to a nonlinear output gradation value corresponding to the display characteristic, which is displayed. Hence, the gamma value described above is preferably the reciprocal of the gamma value (e.g., 2.2) that defines the display characteristic of the display panel 100 (i.e., 0.45=1/2.2). In other words, the panel inverse gamma RGB LUT should be an LUT that achieves inverse transform that accords with the display characteristic described above. The panel inverse gamma RGB LUT is not limited to such an LUT, nevertheless. In the case where the gamma value is 1/2.2, the output gradation value, panelRevLut[n], allocated to the input gradation value n in the LUT, can be obtained by the following expression (4):

$$panelRevLut[n] = 255 \times \left(\frac{n}{255}\right)^{\frac{1}{2.2}} \tag{4}$$

The RGB transform unit 70 applies the inverse gamma RGB LUT stored in the panel inverse gamma RGB LUT storage unit 60, to the result of subtraction, R1[*n*], G1[*n*], B1[*n*], received from the subtracter 55. The application of the inverse gamma RGB LUT to the result of subtraction, R1[*n*], G1[*n*], B1[*n*], by means of the RGB transform unit 70, is equivalent to the following expression (5):

$$RGB\mathrm{LUT}\_R[n]=\mathrm{panelRevLut}[R1[n]]$$

$$RGB\mathrm{LUT}\_G[n]=\mathrm{panelRevLut}[G1[n]]$$

$$RGB\mathrm{LUT}\_B[n]=\mathrm{panelRevLut}[B1[n]] \tag{5}$$

Figure 4:
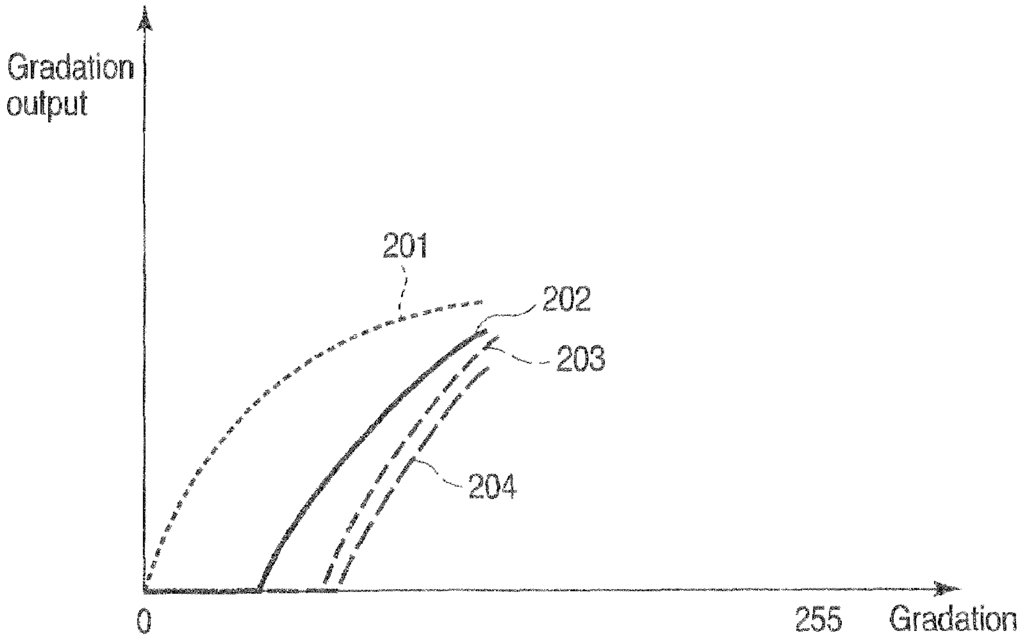
FIG. 4 is a graph representing the concept of the conversion process performed by the RGB conversion unit shown in FIG. 1.

That is, as FIG. 4 shows, the RGB transform unit 70 transforms R1[*n*] 102, G1[*n*] 103 and B1[*n*] 104 (see FIG. 2) in accordance with panel inverse gamma characteristic panelRevLut[n] 201. Thereby, RGBLUT_R[n] 202, RGBLUT_G[n] 203, and RGBLUT_B[n] 204 are derived. The RGB transform unit 70 inputs the RGB values (i.e., RGBLUT_R[n], RGBLUT_G[n], RGBLUT_B[n]), thus derived, to the image-compensation RGB LUT storage unit 80.

The image-compensation RGB LUT storage unit 80 stores an image compensation RGB LUT in which the input RGB values (Rin, Gin, Bin) are associated with output RGB values (Rout, Gout, Bout) that are correction values that should be applied, instead of the input RGB values, to the display panel 100. More precisely, when the RGB values (RGBLUT_R[n] RGBLUT_G[n] RGBLUT_B[n] are input from the RGB transform unit 70 to the image-compensation RGB LUT storage unit 80, (Pin=n, Rout=RGBLUT_R[n]), (Gin=n, Gout=RGBLUT_G[n]) and (Bin=n, Bout=RGBLUT_B[n]) are registered in the image-compensation RGB LUT storage unit 80 as input-output combinations.

The RGB compensation unit 90 applies the image compensation RGB LUT stored in the image-compensation RGB LUT storage unit 80 to the input RGB values (Rin, Gin, Bin), acquiring RGB values (Rout, Gout, Gout) That is, the RGB compensation unit 90 realizes the process expressed by the following expression (6):

$$R\mathrm{out}=RGB\mathrm{LUT}\_R[\mathrm{Rin}]$$

$$G\mathrm{out}=RGB\mathrm{LUT}\_G[G\mathrm{in}]$$

$$B\mathrm{out}=RGB\mathrm{LUT}\_B[B\mathrm{in}] \tag{6}$$

The RGB compensation unit 90 inputs the RGB values (Rout, Gout, Bout) to the display panel 100, as correction values in place of the input RGB values.

Figure 5:
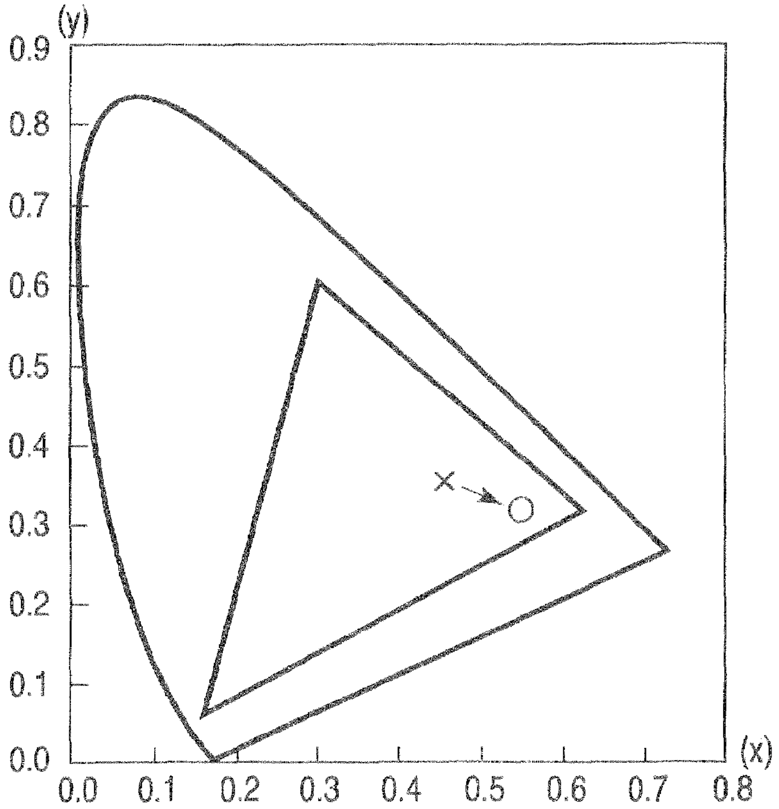
FIG. 5 is a graph schematically representing the effect achieved by the image compensation process the RGB compensation unit shown in FIG. 1 performs.

In FIG. 5, the triangular region indicates a region of the colors that the display panel 100 can present, mark X shows the xy chromaticity the image has if input to the display panel 100 without being corrected in gradation value, and mark O shows the xy chromaticity the image has if input to the display panel 100 after being corrected in gradation value by the RGB compensation unit 90. If the graduation value is input to the LCD panel 100 to display the image from which the spectrum of the reflected ambient light has been canceled, the decrease of color reproducibility can be suppressed, which has resulted from the superimposition of the reflected ambient light spectrum on the output image. (That is, the color gamut in which the image is displayed can be prevented from narrowing.

As described above, the image compensation device according to this embodiment (a) performs inverse transform equivalent to the gamma correction applied to the gradation value that can be input to the display panel, thereby calculating the gradation value at which the display panel should display images; (b) derives, from the gradation value thus calculated, a gradation value from which the gradation value free of the reflected ambient light; and (c), derives the gradation value obtained by performing the inverse transform based on the display characteristic of the display panel on the gradation value free of the reflected ambient light, as a correction value to apply to the display panel in place of the gradation value to input. Therefore, in the image compensation device according to this embodiment, the display panel displays an image based on the correction value (i.e., image from which the gradation value corresponding to the reflected ambient light has been canceled), which is faithful in color to the input image even in an environment where the ambient light is intense. Further, the image displayed can remain faithful in color, irrespective of the changes in the intensity of the ambient light.

Moreover, the image compensation device and the display panel 100, both according to this embodiment, can be configured as components of an apparatus capable of reproducing images (hereinafter, referred to as "image reproducing apparatus") such as a cellular phone, a personal computer, a PDA or a portable media player. The image compensation device and display panel 100 according to the present embodiment can be provided as components of an image reproducing apparatus having such a configuration as shown in FIG. 6.

Figure 6:
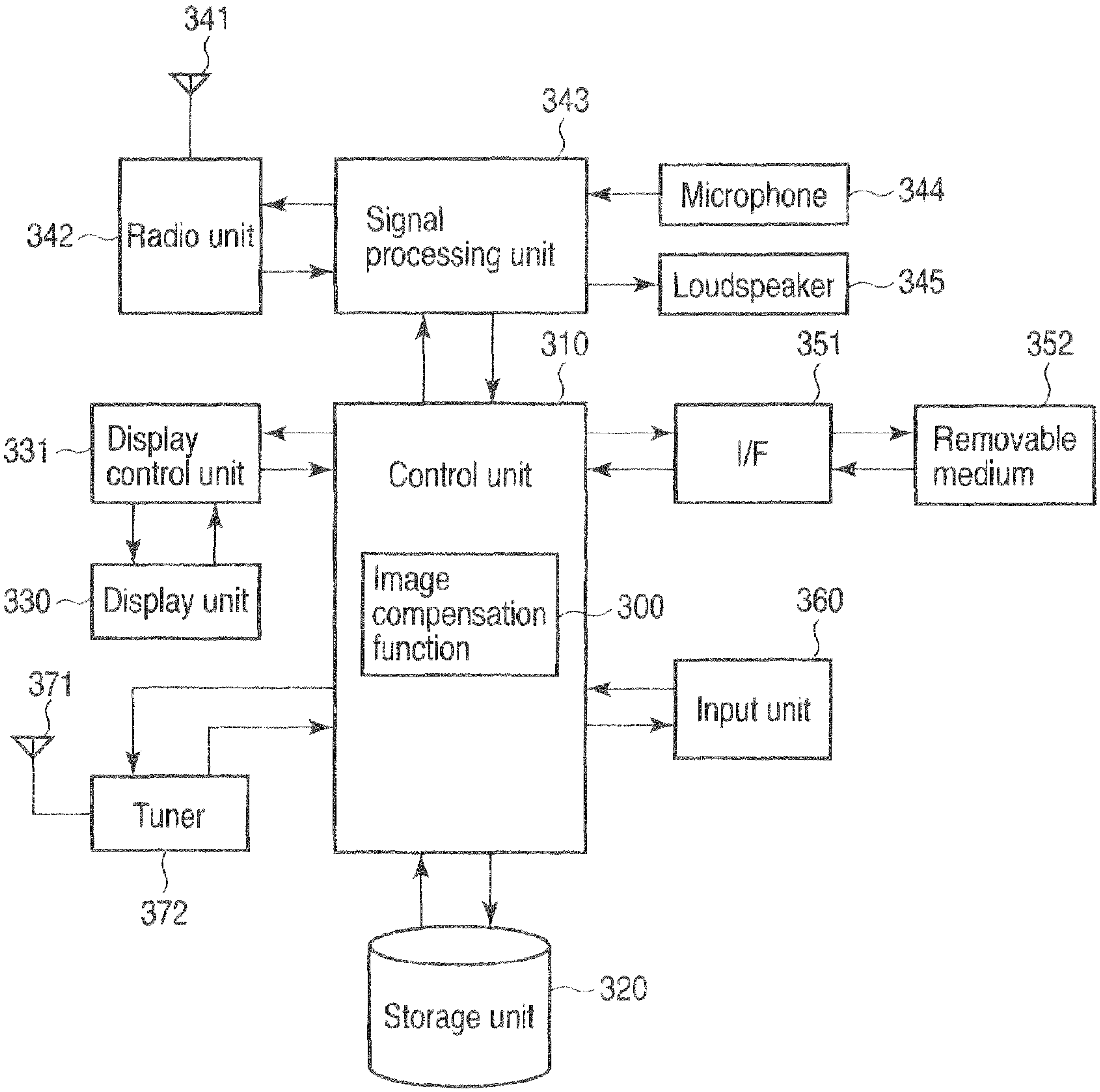
FIG. 6 is a block diagram showing exemplary hardware configurations the image compensation device and display panel shown in FIG. 1 may have.

The image reproducing apparatus of FIG. 6 has a control unit 310, a storage unit 320, a display control unit 331, a display unit 330, and an input unit 360.

The control unit 310 has a processor such as a CPU and controls the other components of the image reproducing apparatus. The control unit 310 may execute, for example, the image compensation program stored in the storage unit, 320 or a removable medium 352, thereby to operate as an image compensation function 300 that is equivalent to the XYZ-to-RGB conversion unit 30, subtracter 55, RGB transform unit 70 and RGB compensation unit 90, all shown in FIG. 1. The image compensation function 300 may be, in part or entirety, not the control unit 310, but the display control unit 331. Alternatively, the image compensation function 300 may be constituted by components different from the control unit 310 and the display control unit 331.

The storage unit 320 is a storage medium such as a random access memory (RAM), a read only memory (ROM), or a hard disk. The storage unit 329 stores the control program and control data for the control unit 310, the various data items the user has generated, and the control data transferred from the removable medium 352. The storage unit 320 may store the image compensation program, too, which enables the image compensation function 300 to operate. Further, the storage unit 320 may incorporate some or all of the panel reflection ratio storage unit 10, RGB-offset value storage unit 40, ideal inverse γRGB LUT storage unit 50, panel inverse gamma RGB LUT storage unit 60 and image-compensation RGB LUT storage unit 80.

The display control unit 331 controls the display unit 330, which is equivalent to the display panel 100 (FIG. 1), in accordance with the instruction received from the control unit 310, causing the display unit 330 to display the image represented by the video signal supplied from the control unit 310.

The input unit 360 includes the light sensor 20 shown in FIG. 1. The input unit 360 may include a user interface that receives requests the user has made by operating an input device such as key switches (e.g., a so-called numeric keypad) or a touch panel.

The image reproducing apparatus of FIG. 6 may include all or some of the components illustrated in FIG. 6, i.e., an antenna 341, a radio unit 342, a signal processing unit 343, a microphone 344, a loudspeaker 345, an interface 351, a removable medium 352, an antenna 371, and a tuner 372.

The radio unit 342 operates in accordance with the instructions issued from the control unit 310, up-converting the transmission signal output from the signal processing unit 343, into a signal of a radio-frequency band, transmitting this signal to a base station on the mobile communications network (not shown), receiving a radio signal from the base station via the antenna 341, and down-converting the radio signal to a baseband signal.

The signal processing unit 343 operates in accordance with the instruction given by the control unit 310. More precisely, the signal processing unit 343 converts the voice signal input from the microphone 344 into transmission data, demodulates a carrier wave with the transmission data, thereby generating the transmission signal, demodulating the carrier wave so modulated, acquiring the received data, and causes the loudspeaker 345 to output an voice signal obtained by demodulating the received data.

The interface (I/F) 351 is an interface configured to connect the removable medium 352 physically and electrically to the control unit 310. The control unit 310 controls the interface 351. The removable medium 352 may store a coded stream composed of the video signal representing the image the display unit 330 may display. The removable medium 352 may incorporate all or some of the panel reflection ratio storage unit 10, RGB-offset value storage unit 40, ideal inverse γRGB LUT storage unit 50, panel inverse gamma RGB LUT storage unit 60 and image-compensation RGB LUT storage unit 80.

The tuner 372 receives a television broadcast signal transmitted from a broadcasting station (not shown) via the antenna 371, acquiring the coded stream contained in the television broadcast signal. Note that the video signal representing the image the display unit 330 will display is multiplexed in the television broadcast signal.

Second Embodiment

An image compensation device according to a second embodiment of this invention differs from the image compensation device according to the second embodiment, in part in terms of configuration. The second embodiment will be described below, referring mainly to the points that distinguish the second embodiment from the first embodiment.

The display panel 100 to which the image compensation according to the first embodiment can be applied is not particularly limited in terms of configuration. The present embodiment is designed on the assumption that the display panel 100 is, for example, an LCD panel that has a backlight.

In the first embodiment, the image is compensated to suppress the decrease of color-reproducibility in the image displayed, which may result from the displayed image influenced by the reflected ambient light. If a pseudo white LED is used as the backlight, red and green will be degraded in color-reproducibility, as is known in the art. The smaller the gradation value of the input image, the more prominent will be the influence of the leakage spectrum. Hence, if a black image of the smallest gradation value is displayed, a phenomenon known as "black de-intensification" will result from the above-mentioned leakage spectrum.

In this embodiment, the RGB offset value that the subtracter 55 subtracts from the gradation value is an RGB value obtained by adding the RGB value corresponding to the reflected ambient light (hereinafter referred to as "RGB value of the reflected ambient light") to the RGB value corresponding to the leakage spectrum (hereinafter referred to as "RGB value of the leakage spectrum").

The RGB value of the leakage spectrum can be derived by first measuring the tristimulus value (X, Y, Z) the display panel 100 has at the time of, for example, total black display, with a spectral radiometer, and then converting the tristimulus value to an RGB value by using, for example, the expression (1) given above.

The subtracter 55 may subtract the RGB offset value from the gradation value by any method available. For example, the RGB offset value stored in the RGB-offset value storage unit 40 may be an RGB value obtained by adding the RGB value of the reflected ambient light to the RGB value of the leakage spectrum. Alternatively, a storage unit (not shown) for storing the RGB value of the leakage spectrum may be provided in addition to the RGB-offset value storage unit 40, and the subtracter 55 may subtract the sum of the RGB value of the reflected ambient light and the RGB value of the leakage spectrum from the gradation value.

Various RGB values for the leakage spectrum may be generated, which correspond to various backlight-luminance values the display panel 100 may have. In other words, the backlight is designed to illuminate the display panel 100 at various different luminance values. Each of these luminance values is divided into a plurality of levels. While the backlight is illuminating the display panel 100 at a representing value (for example, maximum, minimum and intermediate) within each of the levels, the spectral radiometer measures the tristimulus value (X, Y, Z). The tristimulus value (X, Y, Z) may be converted to an RGB value, and on RGB value of the leakage spectrum may be derived for each luminance level. If the luminance of the backlight greatly changes, the RGB value of the leakage spectrum will charge in proportion. Since various RGB values provided for the leakage spectrum correspond to the luminance levels, the device can achieve image compensation with high color reproducibility, regardless of the luminance at which the backlight illuminates the display panel 100.

If RGB values that differ, step by step, are associated with the various luminance levels at which the backlight can illuminate the display panel 100, the subtracter 55 may only need to perform subtraction by using the RGB value of the leakage spectrum, which correspond to the present luminance level.

As has been described, the image compensation device according to this embodiment performs image compensation to cancel, at the display panel having a backlight, not only the reflected ambient light, but also the leakage spectrum from the backlight. The image compensation device can therefore suppress the decrease of color-reproducibility in the image displayed, which has resulted from not only the reflected ambient light, but also the leakage spectrum.

As indicated above, the value of the leakage spectrum from the backlight may be changed, step by step, in accordance with the change in the luminance at which the backlight illuminates the display panel. Use of an appropriate one of these leakage spectrum values compensates for the change in the leakage spectrum successfully maintaining high color reproducibility in the image displayed.

Third Embodiment

In the second embodiment described above, the image is corrected in order to cancel the reflected ambient light and the spectrum leaking from the backlight. However, it is not absolutely necessary to cancel the reflected ambient light in order to achieve high color reproducibility This is because the influence the reflected ambient light imposes on the image displayed is relatively small if the ambient light has very low illuminance. That is, the color reproducibility can be sufficiently enhanced by canceling solely the spectrum leaking from the backlight.

The image compensation apparatus according to the third embodiment differs from the image compensation apparatus of FIG. 1 in two respects. First, the panel reflection ratio storage unit 10, light sensor 20 and XYZ-to-RGB conversion unit 30 are not used. Second, the RGB value corresponding to the backlight leakage spectrum of the display panel 100 is stored in the RGB-offset value storage unit 40.

The image compensation apparatus according to this embodiment (a) performs inverse conversion corresponding to the correction performed on the gradation value to input to the display panel, calculating the gradation value at which the display panel should display images, (b) acquires, from the gradation value to display, the gradation value free of the backlight leakage spectrum of the display panel, and (c) acquires the gradation value obtained by performing inverse conversion on the canceled gradation value in accordance with the display characteristics of the display panel, as a correction value to apply to the display panel in place of the gradation value input. Hence, the image compensation device according to this embodiment can set an image compensation value that corresponds to the input image now free of the leakage spectrum of the backlight. The image compensation value thus set is supplied to the display panel. The display panel can therefore display an image superimposed with the leakage spectrum of the backlight. The image displayed can therefore have color reproduced at high precision even if it has a relatively low graduation.

The image compensation device according to this embodiment can have a simpler configuration than that of the image compensation device according to the first embodiment, because a light sensor need not be provided and the RGB offset value (hence, image correction value, either) need not be updated. Further, the image correction value set by the image compensation device according to this embodiment may be supplied to an image reproducing apparatus that has a display panel. For example, an image compensation RGB LUT may be generated in the image compensation device according to this embodiment and may be stored in a storage unit that is connected to the image reproducing apparatus.

The leakage spectrum of the backlight may have various values that differ, step by step, in association with the various luminance levels at which the backlight can illuminate the display panel. Using these various leakage spectrum values, the change of the leakage spectrum of the backlight, which results from the luminance change of the backlight, can be compensated for, successfully maintaining high color reproducibility in the image displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image compensation device comprising:

a light sensor which measures an intensity of ambient light incident on a display panel;

a first storage unit configured to store a reflectance of the display panel;

a first transform unit configured to convert a value obtained by multiplying the intensity of the ambient light by a reflection ratio to a value of the same form as a first gradation value to be applied to the display panel, and acquire a second gradation value;

a subtracter which subtracts the second gradation value from a third gradation value obtained through a first inverse transform corresponding to gamma correction already performed on the first gradation value, and acquires a fourth gradation value;

a second transform unit configured to perform a second inverse transform corresponding to a display characteristic of the display panel on the fourth gradation value, and acquire a fifth gradation value;

a second storage unit configured to store a first look-up table in which the fifth gradation value is associated with the first gradation value, as a correction value which should be applied to the display panel in place of the first gradation value; and a compensation unit configured to use the first look-up table, and compensate an image input to the display panel.

2. The device according to claim 1, further comprising:

a third storage unit configured to store a second look-up table for achieving the first inverse transform; and a forth storage unit configured to store a third look-up table for achieving the second inverse transform.

3. The device according to claim 1, wherein the subtracter subtracts, from the third gradation value, the second gradation value and a leakage spectrum value of a backlight illuminating the display panel, and acquire the fourth gradation value.

4. The device according to claim 3, wherein the leakage spectrum value of the backlight has been measured by causing the display panel to perform total black display.

5. The device according to claim 4, wherein the leakage spectrum value of the backlight has been prepared as various values based on various luminance levels of the backlight.

6. The device according to claim 1, wherein the light sensor is an illuminance sensor.

7. The device according to claim 1, wherein the light sensor is a spectral radiometer.

8. An image compensation method comprising:

measuring an intensity of ambient light incident on a display panel, by a light sensor;

reading a reflection ratio of the display panel from a first storage unit;

converting a value obtained by multiplying the intensity of the ambient light by the reflection ratio to a value of the same form as a first gradation value to be applied to the display panel, and acquiring a second gradation value;

subtracting the second gradation value from a third gradation value obtained through a first inverse transform corresponding to gamma correction already performed on the first gradation value, and acquiring a fourth gradation value;

performing a second inverse transform corresponding to a display characteristic of the display panel on the fourth gradation value, and acquiring a fifth gradation value;

setting a first look-up table in which the fifth gradation value is associated with the first gradation value, as a correction value which should be applied the display panel in place of the first gradation value; and compensating an image input to the display panel, by using the first look-up table.

9. The method according to claim 8, further comprising:

reading, from a second storage unit, a second look-up table for achieving the first inverse transform; and reading, from a third storage unit, a third look-up table for achieving the second inverse transform.

10. The method according to claim 8, wherein the fourth gradation value is acquired by subtracting, from the third gradation value, the second gradation value and a leakage spectrum value of a backlight illuminating the display panel.

11. The method according to claim 10, wherein the leakage spectrum value of the backlight has been measured by causing the display panel to perform total black display.

12. The method according to claim 11, wherein the leakage spectrum value of the backlight has been prepared as various values based on various luminance levels of the backlight.

13. The method according to claim 8, wherein the light sensor is an illuminance sensor.

14. The method according to claim 8, wherein the light sensor is a spectral radiometer.

15. A method for setting image compensation values, comprising:

subtracting a second gradation value corresponding to a leakage spectrum value of a backlight illuminating a display panel from a third gradation value obtained through a first inverse transform corresponding to gamma correction already performed on a first gradation value to be applied to the display panel, and acquiring a fourth gradation value;

performing a second inverse transform corresponding to a display characteristic of the display panel on the fourth gradation value, and acquiring a fifth gradation value; and setting a first look-up table in which the fifth gradation value is associated with the first gradation value, as a correction value which should be applied the display panel in place of the first gradation value.

16. The method according to claim 15, further comprising:

reading, from a first storage unit, a second look-up table for achieving the first inverse transform; and reading, from a second storage unit, a third look-up table for achieving the second inverse transform.

17. The method according to claim 15, wherein the leakage spectrum value of the backlight has been measured by causing the display panel to perform total black display.

18. The method according to claim 17, wherein the leakage spectrum value of the backlight has been prepared as various values based on various luminance levels of the backlight.

* * * * *